May 25, 1948.   M. R. FAIRCHILD   2,441,996
HOG CATCHER
Filed Aug. 17, 1945
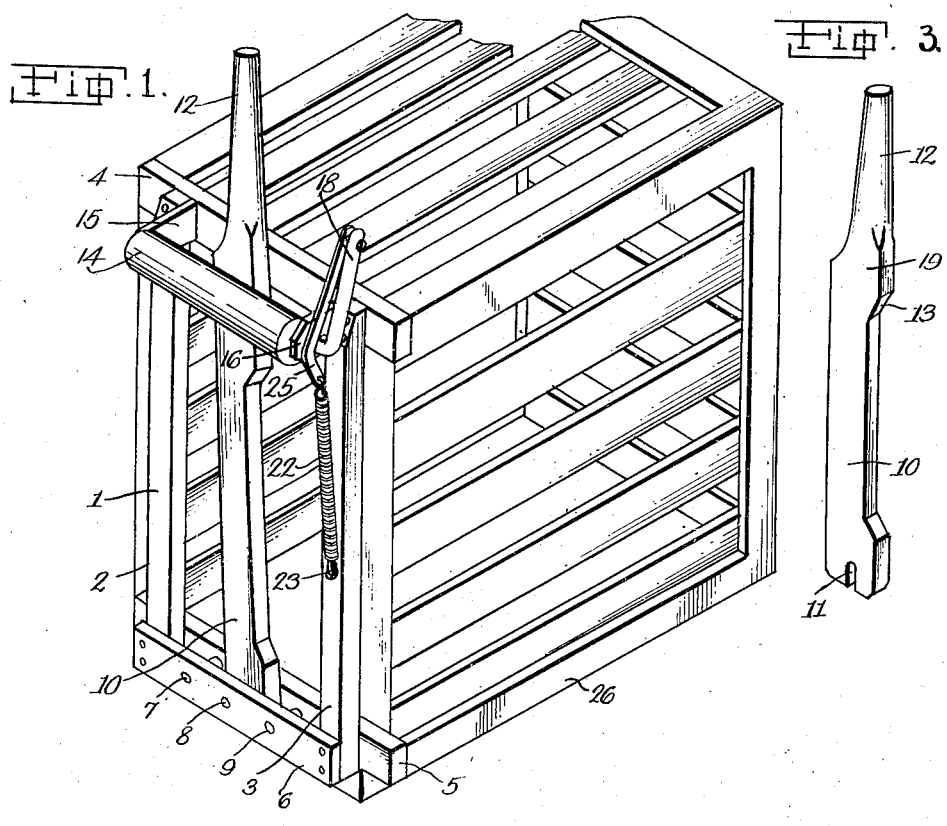
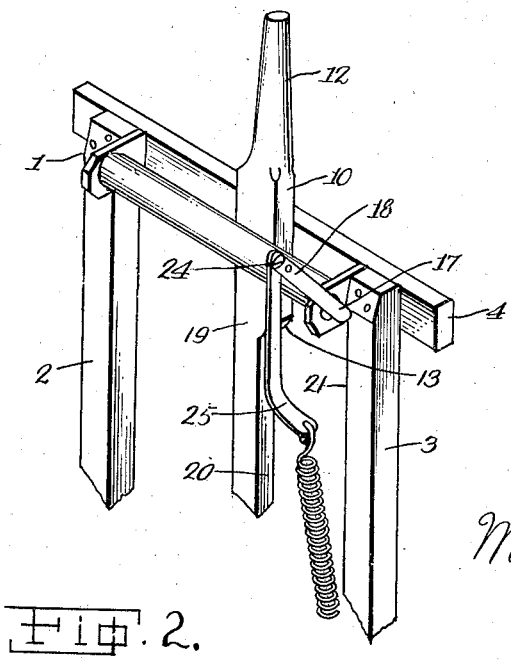
Meryl R. Fairchild
Inventor
By: A. B. McCall
Atty.

Patented May 25, 1948

2,441,996

UNITED STATES PATENT OFFICE 2,441,996

HOG CATCHER

Meryl R. Fairchild, Rochester, Ill.

Application August 17, 1945, Serial No. 610,959

2 Claims. (Cl. 119—98)

My invention relates to hog catchers, and particularly to means for catching and holding hogs with ease and no struggles.

A purpose of my device is to provide a hog catcher that is simple, sturdy, convenient and inexpensive.

A particular purpose of my invention is to provide a hog catcher that is constructed in a manner that its simplicity, novelty and sturdiness will make it operable to catch a hog with ease and hold him with no manual struggles.

I achieve the purposes of my invention by the device described in this specification, defined in the claims and shown in the drawings, wherein:

Figure 1 is a perspective of my hog catcher with a crate and showing the cam cylinder brake in released position.

Figure 2 is a detail in perspective showing the cam cylinder brake resiliently held in clamped position by the spring.

Figure 3 is a perspective of the lever arm alone.

I shall now describe the outstanding features of novelty in my hog catcher as I make reference to the drawings herewith.

Thus, in my device I provide a frame 1 with upright side members 2 and 3 spaced apart and top cross bar 4 and bottom cross member 5. This bottom member 5 has a front plate 6 and several spaced cross bolts 7, 8 and 9 secured across the space between the bottom 5 of frame 1 and the front plate 6 thereof as a selective support for an upright pivotally adjustable lever arm 10 which has a bottom end slot 11 and a top control handle end 12 as well as preferably an upright side recess 13 adapted to contact a hog when catching and holding one.

Across the top of frame 1 on about the level with top cross bar 4 a cam cylinder 14 is pivotally supported on brackets 15 and 16. This cylinder 14 has an eccentric axle 17 for its support contact with brackets 15 and 16 and axle 17 extends through bracket 16 and turns upward to define a handle 18 also, for the optional manual control of cam cylinder 14.

Thus, when handle 18 extends upright in position then the cam cylinder is released from its rotatable brake contact with the front face 19 of integral lever arm 10; but, when cam handle lever 18 pivotally swings outwardly to the position shown in Figure 2, then cam cylinder 14 pivotally rotates to a tight braking contact with front face 19 of integral lever arm 10, and when this cam cylinder brake action is effected a hog can be easily held by lever arm 10 and between recessed edge 20 of lever arm 10 and inner edge 21 of frame member 3.

In order to firmly hold integral cam cylinder 14 rotatably against lever arm face 19 with no need of any hand struggle to hold the hog when it is caught, I am providing a spring 22 secured by its end 23 to the face of frame member 3 and connected freely with top end 24 of cam handle lever 18 through a curved strap member 25 which curves around axle 17 near bracket 16 so as to thus be able by this means to resiliently hold cam cylinder 14 in a rotatably released position as well as to be able to utilize the full spring strength in holding the cam cylinder into a tightly gripped rotatable clamping engagement with face 19 of integral lever arm 10 when catching and holding a hog between this arm and frame side 3.

When a large hog is to be caught, then lever arm 10 has its support on pin 7 to make more room between arm 10 and side 3 of frame 1, and so on for smaller hogs pin 9 would be used.

It will be obvious that my device can be used across a live stock runway or detachably secured to a crate 26 if desired when used, and what I claim is:

1. A hog catcher comprising an upright frame, defining an upright rectangular passage for hogs and the like, a second class lever arm uprightly disposed in said passage of the frame, a plurality of spaced pivotal supporting pins fixed across the bottom member of said frame, an open slot defined in the bottom end of said lever for a quick selective fitting over any one of said pins, and a handle end shaped in the top of said lever arm, a horizontal brake cam cylinder pivotally supported across the face of said frame and lever arm near the top, an integral brake lever for its pivotal adjustment in operation, a spring member for resiliently holding said cam rotatably firm against said lever arm when the lever is pivotally moved toward an adjacent side of said frame and a curved strap connecting said spring with said brake lever for holding said brake cam in released as well as clamped position across said lever arm in said frame.

2. As a new article of manufacture, a hog catcher, comprising an upright rectangular frame, a lever arm pivotally adjustable across the face of said frame, a plurality of spaced supporting pins fixed across the bottom member of said frame, said lever arm shaped to define a terminal slot in its bottom end for a quick selective fitting on any one of said pins and to define a control handle at the lever's top end, a horizontal cam cylinder pivotally supported across the upper face of said frame for a quick rotatable braking contact with said lever arm for catching and holding a hog between the frame side and lever arm as the animal attempts to pass through said frame, a cam control lever normally extending upright from one end of said integral cam cylinder, a spring on said frame and a curved strap connection between the free end of the cam lever and the spring for holding the cam cylinder in rotatably released position away from said lever arm as well as holding the cam resiliently into a firm contact with the side of said lever arm when such arm is pivotally jerked over into a flanking engagement with the side of a hog to hold the hog with ease.

MERYL R. FAIRCHILD.